United States Patent [19]

Kyuda et al.

[11] Patent Number: 5,245,004
[45] Date of Patent: Sep. 14, 1993

[54] ANHYDROUS POLYMERIZATION OF CAPROLACTAM WITH CATALYST, COCATALYST AND ACTIVATOR

[75] Inventors: Keizo Kyuda, Kyoto; Kazushige Kojima, Aichi; Mitsunobu Satoh; Takaaki Matsuo, both of Kyoto, all of Japan

[73] Assignee: Unitika Ltd., Hyogo, Japan

[21] Appl. No.: 910,398

[22] Filed: Jul. 8, 1992

[30] Foreign Application Priority Data

Jul. 9, 1991 [JP] Japan .................................. 3-195888
Nov. 15, 1991 [JP] Japan .................................. 3-328063

[51] Int. Cl.$^5$ ............................................. C08G 69/20
[52] U.S. Cl. .................................... 528/319; 528/312; 528/313; 528/315; 528/323
[58] Field of Search ............... 528/319, 312, 313, 315, 528/323

[56] References Cited

U.S. PATENT DOCUMENTS 3,018,273  1/1962  Butler et al. ........................ 528/319

*Primary Examiner*—Harold D. Anderson
*Attorney, Agent, or Firm*—Sughrue, Mion, Zinn, Macpeak & Seas

[57] ABSTRACT

A process for forming an ultra-high molecular weight nylon 6 by polymerizing ε-caprolactam, which comprises heating substantially anhydrous ε-caprolactam at a temperature of from 100° to 200° C. in the presence of (a) a main catalyst selected from a Grignard compound and a halogenated magnesium lactamate, (b) a cocatalyst selected from an acyl lactam compound and an isocyanic acid ester and (c) at least one activator selected from the group consisting of amides, sulfoxides, thioethers and phosphoric esters. According to this inventive process, an ultra-high molecular weight nylon 6 can be produced within a short period of time, making use of industrially advantageous compounds which are stable in air, hardly dangerous and inexpensive. Being free from cross-linkings, the ultra-high molecular weight nylon 6 obtained by the process of this invention is soluble in various solvents and is useful as a starting material for the production of high strength and high modulus materials.

21 Claims, No Drawings

ANHYDROUS POLYMERIZATION OF CAPROLACTAM WITH CATALYST, COCATALYST AND ACTIVATOR

FIELD OF THE INVENTION

This invention relates to a process for polymerization of ε-caprolactam, by which an ultra-high molecular weight nylon 6 can be produced. The thus-produced nylon 6 is particularly useful as a suitable starting material in the production of a high strength and high modulus materials.

BACKGROUND OF THE INVENTION

Production of polyamide from lactam as a starting material is generally effected by means of melt polymerization of lactam using water as a catalyst, a combination of such melt polymerization with solid-state polymerization, anionic polymerization and the like. However, when a polyamide material obtained by such polymerization methods is used in the conventional molding and processing of fibers, films and the like, the processed products show inferior strength and modulus, e.g., merely about, 5 to 10% of the theoretical strength and modulus. Low molecular weight of such a type of polyamide can be regarded as a primary factor giving rise to these inferior properties.

For example, in the case of synthesis of nylon 6 by polymerization of ε-caprolactam, nylon 6 obtained by melt polymerization of ε-caprolactam using water as a catalyst has an inherent limitation in terms of its weight average molecular weight; a maximum weight average molecular weight of only about 100,000 can be obtained. Also, when the nylon 6 obtained by such melt polymerization followed by a solid-state polymerization, its weight average molecular weight can be increased, but with a concomitant broadened molecular weight distribution, sometimes also resulting in multimodal distribution.

In the case of anionic polymerization in which alkali metals such as sodium, potassium and the like and Grignard compounds are used as the main catalysts, nylon 6 obtained by such a process has a higher molecular weight than in the case of melt polymerization or the combination of melt polymerization with solid-state polymerization. For example, JP-B-43-1621 (the term "JP-B" as used herein means an "examined Japanese patent publication") discloses a process for anionic polymerization of ε-caprolactam in which an alkali metal and N-aluminum-ε-caprolactam are used as catalysts. However, the solvent-soluble portion of nylon 6 obtained by this process has a weight average molecular weight of only about 250,000 which is not a satisfactory level when the product is used in subsequent applications as a high strength and high modulus starting material.

JP-B-1-19807 discloses that nylon 6 having a weight average molecular weight of from $3 \times 10^5$ to $10 \times 10^5$ can be obtained by anionic polymerization of ε-caprolactam using a Grignard compound, an acyl lactam compound and an organo aluminum compound. However, the organo aluminum compound used in this process is neither economical nor practical to use, because not only this compound is expensive, but also it has such an unstable nature that it is decomposed easily in air which leads to a possible danger of igniting and causing combustion.

JP-B-42-26874 (corresponding to U.S. Pat. No. 3,359,227) discloses that a molded polyamide product having a markedly high strength can be obtained by the use of a tertiary amide, a dialkyl sulfoxide and a dialkyl sulfone in an amount of from 1 to 20% by weight, preferably from 3 to 7% by weight, in addition to the use of a known alkaline main catalyst and a cocatalyst. This disclosure, however, does not include data regarding viscosity and molecular weight of the molded polyamide product. In addition, metallic sodium and sodium lactamate are used as the main catalysts in the Examples of this disclosure. Such main catalysts, however, are difficult to handle because of their unstable nature in comparison with Grignard compounds, in addition to another disadvantage in that a polymerization reaction using these main catalysts frequently causes side reactions which leads to decreased polymer yield.

SUMMARY OF THE INVENTION

In view of the above, it is an object of the present invention to provide a process for polymerization of ε-caprolactam, by which a solvent-soluble ultra-high molecular weight nylon 6 having no cross-linking can be produced quantitatively, e.g., in 100% yield, making use of industrially advantageous compounds which are stable in the air, hardly dangerous and inexpensive.

With the aim of overcoming the aforementioned problems, the inventors of the present invention have conducted intensive studies and found that such an ultra-high molecular weight nylon 6 having very desirable properties can be obtained by conducting the polymerization reaction in the presence of a Grignard compound or a halogenated magnesium lactamate as a main catalyst, an acyl lactam compound or an isocyanic acid ester as a co-catalyst and an activator as described below. The present invention has been accomplished based on this finding.

Accordingly, the present invention resides in a process for forming an ultra-high molecular weight nylon 6 by polymerizing ε-caprolactam, which comprises heating substantially anhydrous ε-caprolactam at a temperature of from 100° to 200° C. in the presence of (a) a main catalyst selected from a Grignard compound and a halogenated magnesium lactamate, (b) a co-catalyst selected from an acyl lactam compound and an isocyanic acid ester and (c) an activator, wherein the activator comprises at least one compound selected from the group consisting of amides, sulfoxides, thioethers and phosphoric esters.

Other objects and advantages of the present invention will be made apparent as the description progresses.

DETAILED DESCRIPTION OF THE INVENTION

The term "substantially anhydrous" ε-caprolactam means that the compound contains no water, or at most has a water content of 0.01% by weight. Use of such substantially anhydrous ε-caprolactam leads to excellent yield. Water content of less than 0.01% by weight can be achieved by distilling ε-caprolactam under nitrogen gas or by drying ε-caprolactam at about 40° C. for about 12 hrs. in vacuum.

Grignard compounds eligible for use in the present invention include methylmagnesium chloride, methylmagnesium bromide, methylmagnesium iodide, ethylmagnesium chloride, ethylmagnesium bromide, ethylmagnesium iodide, propylmagnesium bromide, butylmagnesium chloride, phenylmagnesium iodide, benzyl-magnesium bromide, vinylbenzylmagnesium iodide and the like, of which ethylmagnesium bromide and phenylmagnesium iodide are most commonly employed.

Since addition of a Grignard compound to ε-caprolactam catalyzes a reaction to form a halogenated magnesium lactamate, similar results can also be obtained by the use of a separately synthesized halogenated magnesium lactamate instead of a Grignard compound as the main catalyst.

The Grignard compound or halogenated magnesium lactamate may be used in a preferred amount of from 0.05 to 5 mol % based on ε-caprolactam. While the above range represents general preferred guideline, one of ordinary skill in the art would understand that the amount, if too small, would slow down the polymerization rate and, if too large, would lead to nylon 6 having insufficient molecular weight.

Illustrative examples of the activator useful in the present invention include: amides such as dimethylformamide, methylethylformamide, methylbutylformamide, diisopropylformamide, dimethylacetamide, methylphenylacetamide, dimethylpropionamide, diethylpropionamide, methylbenzylpropionamide and dimethylbenzoylamide; sulfoxides such as dimethyl sulfoxide, methylethyl sulfoxide and methylphenyl sulfoxide; thioethers such as methyl sulfide, ethyl sulfide, propyl sulfide, tetrahydrothiophene, dithiane and trithiane; and phosphoric esters such as trimethyl phosphate, triethyl phosphate, methyldiethyl phosphate, tributyl phosphate, triphenyl phosphate and tricresyl phosphate. Of these compounds, dimethylacetamide and dimethyl sulfoxide are particularly preferred.

The activator may be used in a preferred amount of from 0.01 to 1 mol % based on ε-caprolactam. While the above range represents general preferred guideline, one of skill in the art would understand that the amount, if too small, would bear no significant result in relation to the production of the desired ultra-high molecular weight nylon 6, while the amount, if too large, would cause side reactions like the aforementioned case of JP-B-42-26874 in which an activator is used in an amount of from 1 to 20% by weight.

Illustrative examples of suitable acyl lactam compounds include acetylpropiolactam, acetylbutyrolactam, butyrylbutyrolactam, acetylvalerolactam, acetylcaprolactam, butyrylcaprolactam, benzoylcaprolactam, adipoyl-bisbutyrolactam, adipoyl-bis-valerolactam, adipoyl-biscaprolactam, terephthaloyl-bis-caprolactam, isophthaloyl-biscaprolactam and the like, of which acetylcaprolactam, adipoylbis-caprolactam and terephthaloyl-bis-caprolactam are particularly preferred.

Illustrative examples of suitable isocyanic acid esters include methyl isocyanate, ethyl isocyanate, propyl isocyanate, butyl isocyanate, phenyl isocyanate, tolyl isocyanate, benzyl isocyanate, fluorophenyl isocyanate, chlorophenyl isocyanate, cyclohexyl isocyanate, naphthyl isocyanate, hexamethylene diisocyanate, tolylene diisocyanate, xylylene diisocyanate and the like, of which phenyl isocyanate and hexamethylene diisocyanate are particularly preferred.

The acyl lactam compound or isocyanic acid ester may be used as the co-catalyst in a preferred amount of from 0.005 to 1 mol % based on ε-caprolactam. While the above range represents general preferred guidelines, one of ordinary skill in the art would understand that the amounts, if larger than 1 mol %, would bear no significant result in relation to the production of the desired ultra-high molecular weight nylon 6.

The polymerization reaction of the present invention should be carried out at a temperature within the range of from 100° to 200° C., preferably from 120° to 160° C. The polymerization temperature, if lower than 100° C., would slow down the polymerization reaction and, if higher than 200° C., would generate side reactions which would lead to decreased formation of solvent-soluble nylon 6. The total reaction time required in the present invention is easy to be determined for one of skill in the art, taking into consideration the polymerization reactants, the heating temperature, etc.

Any of atmospheric, increased or reduced pressure conditions may be applicable to the polymerization reaction. It is preferred, however, that the reaction is carried out under atmospheric pressure condition.

A Grignard compound or a halogenated magnesium lactamate, an acyl lactam compound or an isocyanic acid ester and an activator may be added to ε-caprolactam in any desired order.

In the process of the present invention, a small amount (for example, 30 mol % or less, based on ε-caprolactam) of one or more other lactam components may be copolymerized with the ε-caprolactam monomer, provided that the presence of any co-monomer does not detract from polymerization of ε-caprolactam and the desired physical properties of the resulting nylon 6 polymer product. Examples of such copolymerizable lactam co-monomers include α-pyrolidone, α-piperidone, enantholactam, capryl lactam, laurolactam and the like.

According to the process of the present invention, an ultra-high molecular weight nylon 6 which is free from cross-linking, is soluble in typical solvents for nylon 6 such as sulfuric acid, formic acid and m-cresol and has a weight average molecular weight of from $5 \times 10^5$ to about $30 \times 10^5$ can be produced conveniently, making use of an inexpensive activator which has a considerably stable nature in comparison with organo aluminum compounds, is hardly decomposed in air and therefore is not dangerous from the standpoint of causing ignition.

The following Examples are provided to further illustrate the present invention. It is to be understood, however, that the Examples are for purpose of illustration only and are not intended as a definition of the limits of the invention.

In the following Examples, weight average molecular weight was measured by ALC/GPC 150C gel permeation chromatography (Waters Associates, Inc.) equipped with a differential refractometer under conditions of: standard sample, polystyrene; column temperature, 100° C.; eluent, mcresol; flow rate, 0.4 ml/min; and sample concentration, 0.1% by weight.

EXAMPLE 1

Under atmospheric pressure and in a stream of nitrogen, to 1 mole of anhydrous ε-caprolactam kept at 80° C. were added 0.001 mole of acetylcaprolactam and 0.005 mole of ethylmagnesium bromide (3.0 mol/l solution in diethyl ether). After distilling off diethyl ether, 0.001 mole of dimethyl sulfoxide was added to the residual portion, and the resulting polymerization system was heated at 130° C. The polymerization reaction was completed after 25 minutes of heating when the polymerization system became such a state that stirring of the system could not be continued. In this manner, white-colored nylon 6 having a weight average molecular weight of $18.0 \times 10^5$ was obtained in 100% yield. The nylon 6 thus obtained dissolved easily in formic acid, m-cresol, sulfuric acid and the like at room temperature.

EXAMPLE 2

To 1 mole of anhydrous ε-caprolactam were added 0.003 mole of ethylmagnesium bromide (3.0 mol/l solution in diethyl ether) and 0.001 mole of dimethyl acetamide, followed by distilling off diethyl ether and the addition of 0.001 mole of acetylcaprolactam. The resulting polymerization system was heated at 140° C. for 25 minutes to complete the polymerization reaction. In this manner, white-colored nylon 6 having a weight average molecular weight of $5.2 \times 10^5$ which was soluble in various solvents was obtained in 100% yield.

EXAMPLE 3

To 1 mole of anhydrous ε-caprolactam were added 0.005 mole of ethylmagnesium bromide (3.0 mol/l solution in diethyl ether) and 0.0008 mole of triethyl phosphate, followed by distilling off diethyl ether and the addition of 0.0008 mole of acetylcaprolactam. The resulting polymerization system was heated at 140° C. for 60 minutes to complete the polymerization reaction. In this manner, white-colored nylon 6 having a weight average molecular weight of $5.8 \times 10^5$ which was soluble in various solvents was obtained in 100% yield.

EXAMPLE 4

Under atmospheric pressure and in a stream of nitrogen, to 1 mole of anhydrous ε-caprolactam kept at 80° C. were added 0.001 mole of acetylcaprolactam and 0.005 mole of ethylmagnesium bromide (3.0 mol/l solution in diethyl ether). After distilling off diethyl ether, 0.0005 mole of trithiane was added to the residual portion, and the resulting polymerization system was heated at 130° C. The polymerization reaction was completed after 50 minutes of heating when the polymerization system became such a state that stirring of the system could not be continued. In this manner, white-colored nylon 6 having a weight average molecular weight of $7.9 \times 10^5$ was obtained in 100% yield. The nylon 6 thus obtained dissolved easily in formic acid, m-cresol, sulfuric acid and the like at room temperature.

The results obtained in Examples 1 to 4 are shown in Table 1.

TABLE 1

| | Example | | | |
|---|---|---|---|---|
| | 1 | 2 | 3 | 4 |
| ε-Caprolactam (mole) | 1 | 1 | 1 | 1 |
| Ethylmagnesium bromide (mole) | 0.005 | 0.003 | 0.005 | 0.005 |
| Acetylcaprolactam (mole) | 0.001 | 0.001 | 0.0008 | 0.001 |
| Activator (mole) | dimethyl sulfoxide 0.001 | dimethyl acetamide 0.001 | triethyl phosphate 0.0008 | trithiane 0.0005 |
| Polymerization temp. (°C.) | 130 | 140 | 140 | 130 |
| Polymerization time (min.) | 25 | 25 | 60 | 50 |
| Mw | $18.0 \times 10^5$ | $5.2 \times 10^5$ | $5.8 \times 10^5$ | $7.9 \times 10^5$ |

EXAMPLE 5

Under normal pressure and in a stream of nitrogen, to 1 mole of anhydrous ε-caprolactam kept at 80° C. were added 0.001 mole of terephthaloyl-bis-caprolactam and 0.005 mole of ethylmagnesium bromide (3.0 mol/l solution in diethyl ether). After distilling off diethyl ether, 0.008 mole of dimethyl sulfoxide was added to the residual portion, and the resulting polymerization system was heated at 120° C. The polymerization reaction was completed after 5 minutes of heating when the polymerization system became such a state that stirring of the system could not be continued. In this manner, white-colored nylon 6 having a weight average molecular weight of $15.0 \times 10^5$ was obtained in 100% yield. The nylon 6 thus obtained dissolved easily in formic acid, m-cresol, sulfuric acid and the like at room temperature.

COMPARATIVE EXAMPLE 1

Polymerization was carried out under the same conditions as in Example 1, except that dimethyl sulfoxide was not added to the reaction system. The polymerization reaction proceeded quantitatively and was completed after 50 minutes of heating. The thus-formed polymer, however, showed a weight average molecular weight of only $2.0 \times 10^5$, which could not be regarded as an ultra-high molecular weight nylon 6.

COMPARATIVE EXAMPLE 2

Polymerization was carried out under the same conditions as in Example 1, except that ethylmagnesium bromide was not added to the reaction system. The polymerization reaction hardly proceeded.

COMPARATIVE EXAMPLE 3

Polymerization was carried out under the same conditions as in Example 1, except that acetylcaprolactam was not added to the reaction system. The polymerization reaction proceeded quantitatively and was completed after 45 minutes of heating. The thus-formed nylon 6, however, showed a weight average molecular weight of only $4.0 \times 10^5$.

COMPARATIVE EXAMPLE 4

Under atmospheric pressure and in a stream of nitrogen to 1 mole of anhydrous ε-caprolactam kept at 80° C. were added 0.001 mole of acetylcaprolactam and 0.005 mole of ethylmagnesium bromide (3.0 mol/l solution in diethyl ether). After distilling off diethyl ether, 0.02 mole of dimethyl sulfoxide was added to the residual portion, and the resulting polymerization system was heated at 130° C. The polymerization reaction, however, hardly proceeded.

The results obtained in Comparative Examples 1 to 4 are summarized in Table 2.

TABLE 2

| | Comp. Ex. | | | |
|---|---|---|---|---|
| | 1 | 2 | 3 | 4 |
| ε-Caprolactam (mole) | 1 | 1 | 1 | 1 |
| Ethylmagnesium bromide (mole) | 0.005 | 0 | 0.005 | 0.005 |
| Acetylcaprolactam (mole) | 0.001 | 0.001 | 0 | 0.001 |
| Dimethyl sulfoxide (mole) | 0 | 0.001 | 0.001 | 0.02 |
| Polymerization temp. (°C.) | 130 | 130 | 130 | 130 |
| Polymerization time (min.) | 50 | >360 | 45 | >360 |
| Mw | $2.0 \times 10^5$ | — | $4.0 \times 10^5$ | — |

COMPARATIVE EXAMPLE 5

Under atmospheric pressure and in a stream of nitrogen, to 1 mole of anhydrous ε-caprolactam kept at 80° C. were added 0.001 mole of acetylcaprolactam and 0.005 mole of metallic sodium. After dimethyl sulfoxide (0.001 mole) was added to the mixture, the polymerization system was heated at 130° C. Even after 8 hours of heating, yield of the resulting polymer was only 66%, with a weight average molecular weight of $1.5 \times 10^5$.

EXAMPLE 6

To 1 mole of anhydrous ε-caprolactam were added 0.005 mole of ethylmagnesium bromide (3.0 mol/l solution in diethyl ether) and 0.001 mole of dimethyl sulfoxide, followed by distilling off diethyl ether and the addition of 0.001 mole of phenyl isocyanate. The resulting polymerization system was heated at 140° C. for 25 minutes to complete the polymerization reaction. In this manner, white-colored nylon 6 having a weight average molecular weight of $10.3 \times 10^5$ which was soluble in various solvents was obtained in 100% yield.

EXAMPLE 7

Under atmospheric pressure and in a stream of nitrogen, to 1 mole of anhydrous ε-caprolactam kept at 80° C. were added 0.001 mole of hexamethylene diisocyanate and 0.005 mole of ethylmagnesium bromide (3.0 mol/l solution in diethyl ether). After distilling off diethyl ether, 0.001 mole of dimethyl sulfoxide was added to the residual portion, and the resulting polymerization system was heated at 130° C. The polymerization reaction was completed after 20 minutes of heating when the polymerization system became such a state that stirring of the system could not be continued. In this manner, white-colored nylon 6 having a weight average molecular weight of $12.0 \times 10^5$ was obtained in 100% yield. The nylon 6 thus obtained dissolved easily in formic acid, m-cresol, sulfuric acid and the like at room temperature.

EXAMPLE 8

To 1 mole of anhydrous ε-caprolactam were added 0.005 mole of ethylmagnesium bromide (3.0 mol/l solution in diethyl ether) and 0.0005 mole of hexamethylene diisocyanate, followed by distilling off diethyl ether and the addition of 0.001 mole of dimethyl sulfoxide. The resulting polymerization system was heated at 140° C. for 20 minutes to complete the polymerization reaction. In this manner, white-colored nylon 6 having a weight average molecular weight of $16.3 \times 10^5$ which was soluble in various solvents was obtained in 100% yield.

EXAMPLE 9

To 1 mole of anhydrous ε-caprolactam were added 0.003 mole of ethylmagnesium bromide (3.0 mol/l solution in diethyl ether) and 0.0007 mole of dimethyl sulfoxide, followed by distilling off diethyl ether and the addition of 0.0003 mole of hexamethylene diisocyanate. The resulting polymerization system was heated at 140° C. for 30 minutes to complete the polymerization reaction. In this manner, white-colored nylon 6 having a weight average molecular weight of $22.0 \times 10^5$ was obtained in 100% yield. The polymer thus obtained dissolved easily in formic acid, m-cresol, sulfuric acid and the like at room temperature.

EXAMPLE 10

To 1 mole of anhydrous ε-caprolactam were added 0.01 mole of ethylmagnesium bromide (3.0 mol/l solution in diethyl ether) and 0.005 mole of hexamethylene diisocyanate, followed by distilling off diethyl ether and the addition of 0.001 mole of dimethyl sulfoxide. The resulting polymerization system was heated at 140° C. for 15 minutes to complete the polymerization reaction. In this manner, white-colored nylon 6 having a weight average molecular weight of $6.3 \times 10^5$ which was soluble in various solvents was obtained in 100% yield.

EXAMPLE 11

To 1 mole of anhydrous ε-caprolactam were added 0.03 mole of ethylmagnesium bromide (3.0 mol/l solution in diethyl ether) and 0.007 mole of hexamethylene diisocyanate, followed by distilling off diethyl ether and the addition of 0.01 mole of dimethyl sulfoxide. The resulting polymerization system was heated at 140° C. for 12 minutes to complete the polymerization reaction. In this manner, white-colored nylon 6 having a weight average molecular weight of $5.2 \times 10^5$ which was soluble in various solvents was obtained in 100% yield.

The results obtained in Examples 7 to 11 are summarized in Table 3.

TABLE 3

| | Example | | | | |
|---|---|---|---|---|---|
| | 7 | 8 | 9 | 10 | 11 |
| ε-Caprolactam (mole) | 1 | 1 | 1 | 1 | 1 |
| Ethylmagnesium bromide (mole) | 0.005 | 0.005 | 0.003 | 0.01 | 0.03 |
| Hexamethylene diisocyanate (mole) | 0.001 | 0.0005 | 0.0003 | 0.005 | 0.007 |
| Dimethyl sulfoxide (mole) | 0.001 | 0.001 | 0.0007 | 0.001 | 0.01 |
| Polymerization temp. (°C.) | 130 | 140 | 140 | 140 | 140 |
| Polymerization time (min.) | 20 | 25 | 30 | 15 | 12 |
| Mw | $12.0 \times 10^5$ | $5.2 \times 10^5$ | $22.0 \times 10^5$ | $6.3 \times 10^5$ | $5.2 \times 10^5$ |

EXAMPLE 12

Under atmosphere pressure and in a stream of nitrogen, to 1 mole of anhydrous ε-caprolactam kept at 80° C. were added 0.0005 mole of hexamethylene diisocyanate and 0.005 mole of ethylmagnesium bromide (3.0 mol/l solution in diethyl ether). After distilling off diethyl ether, 0.001 mole of dimethyl acetamide was added to the residual portion, and the resulting polymerization system was heated at 130° C. The polymerization reaction was completed after 20 minutes of heating when the polymerization system became such a state that stirring of the system could not be continued. In this manner, white-colored nylon 6 having a weight average molecular weight of $5.6 \times 10^5$ was obtained in 100% yield. The nylon 6 thus obtained dissolved easily in formic acid, m-cresol, sulfuric acid and the like at room temperature.

EXAMPLE 13

Under atmospheric pressure and in a stream of nitrogen, to 1 mole of anhydrous ε-caprolactam kept at 80° C. were added 0.0005 mole of hexamethylene diisocyanate and 0.005 mole of ethylmagnesium bromide (3.0 mol/l solution in diethyl ether). After distilling off diethyl ether, 0.001 mole of triethyl phosphate was added to the residual portion, and the resulting polymerization system was heated at 130° C. The polymerization reaction was completed after 45 minutes of heating when the polymerization system became such a state that stirring of the system could not be continued. In this manner, white-colored nylon 6 having a weight average molecular weight of $5.8 \times 10^5$ was obtained in 100% yield. The nylon 6 thus obtained dissolved easily in formic acid, m-cresol, sulfuric acid and the like at room temperature.

EXAMPLE 14

Under atmospheric pressure and in a stream of nitrogen, to 1 mole of anhydrous ε-caprolactam kept at 80° C. were added 0.0005 mole of hexamethylene diisocyanate and 0.005 mole of ethylmagnesium bromide (3.0 mol/l solution in diethyl ether). After distilling off diethyl ether, 0.001 mole of trithiane was added to the residual portion, and the resulting polymerization system was heated at 130° C. The polymerization reaction was completed after 30 minutes of heating when the polymerization system became such a state that stirring of the system could not be continued. In this manner, white-colored nylon 6 having a weight average molecular weight of $9.0 \times 10^5$ was obtained in 100% yield. The nylon 6 thus obtained dissolved easily in formic acid, m-cresol, sulfuric acid and the like at room temperature.

The results obtained in Examples 12 to 14 are summarized in Table 4.

TABLE 4

|  | Example | | |
|---|---|---|---|
|  | 12 | 13 | 14 |
| ε-Caprolactam (mole) | 1 | 1 | 1 |
| Ethylmagnesium bromide (mole) | 0.005 | 0.005 | 0.005 |
| Hexamethylene diisocyanate (mole) | 0.0005 | 0.0005 | 0.0005 |
| Activator (mole) | dimethyl acetamide 0.001 | triethyl phosphate 0.001 | trithiane 0.001 |
| Polymerization temp. (°C.) | 130 | 130 | 130 |
| Polymerization time (min.) | 20 | 45 | 30 |
| Mw | $5.6 \times 10^5$ | $5.8 \times 10^5$ | $9.0 \times 10^5$ |

COMPARATIVE EXAMPLE 6

Polymerization was carried out under the same conditions as in Example 7, except that dimethyl sulfoxide was not added to the reaction system. The polymerization reaction proceeded at a very slow rate, with a yield of only 45% even after 5 hours of the reaction. The polymer thus formed was not an ultra-high molecular weight nylon 6, because its weight average molecular weight was only $0.65 \times 10^5$.

COMPARATIVE EXAMPLE 7

Polymerization was carried out under the same conditions as in Example 7, except that ethylmagnesium bromide was not added to the reaction system. The polymerization reaction, however, hardly proceeded.

COMPARATIVE EXAMPLE 8

To 1 mole of anhydrous ε-caprolactam were added 0.0003 mole of ethylmagnesium bromide (3.0 mol/l solution in diethyl ether) and 0.0005 mole of hexamethylene diisocyanate, followed by distilling off diethyl ether and the addition of 0.0005 mole of dimethyl sulfoxide. When the resulting polymerization system was heated at 140° C., the polymerization reaction hardly proceeded.

The result obtained in Comparative Examples 6 to 8 are summarized in Table 5.

TABLE 5

|  | Example | | |
|---|---|---|---|
|  | 6 | 7 | 8 |
| ε-Caprolactam (mole) | 1 | 1 | 1 |
| Ethylmagnesium bromide (mole) | 0.005 | 0 | 0.00003 |
| Hexamethylene diisocyanate (mole) | 0.001 | 0.001 | 0.0005 |
| Dimethyl sulfoxide (mole) | 0 | 0.001 | 0.0005 |
| Polymerization temp. (°C.) | 130 | 130 | 140 |
| Polymerization time (min.) | 300 | >360 | >360 |
| Mw | $0.65 \times 10^5$ | — | — |

According to this inventive process, an ultra-high molecular weight nylon 6 can be produced within a short period of time, employing industrially advantageous compounds which are stable in air, hardly dangerous and inexpensive. Being free from cross-linkings, the ultra-high molecular weight nylon 6 obtained by the process of this invention is soluble in various solvents and is useful as a starting material for the production of high strength and high modulus materials by means of gel spinning and the like.

Although some preferred embodiments have been described, many modifications and variations may be made thereto in the light of the above teachings. It is therefore to be understood that within the scope of the appended claims, the invention may be practiced otherwise than as specifically described.

What is claimed is:

1. A process for forming an ultra-high molecular weight nylon 6 by polymerizing ε-caprolactam, which comprises heating substantially anhydrous ε-caprolactam at a temperature of from 100° to 200° C. in the presence of (a) a main catalyst selected from a Grignard compound or a halogenated magnesium lactamate, (b) a co-catalyst selected from an acyl lactam compound or an isocyanic acid ester and (c) at least one activator selected from the group consisting of (i) amides selected from the group consisting of dimethylformamide, methylethylformamide, methylbutylformamide, diisopropylformamide, dimethylacetamide, methylphenylacetamide, dimethylprionamide, diethylpropionamide, methylbenzylpropionamide and dimethylbenzoylamide, (ii) sulfoxides selected from the group consisting of dimethyl sulfoxide, methylethyl sulfoxide and methylphenyl sulfoxide, (iii) thioethers selected from the group consisting of methyl sulfide, ethyl sulfide, propyl sulfide, tetrahydrothiophene, dithiane and trithiane, and (iv) phosphoric esters selected from the group consisting of trimethyl phosphate, triethyl phosphate, methyldiethyl phosphate, tributyl phosphate, triphenyl phosphate and tricresyl phosphate.

2. The process according to claim 1 wherein said main catalyst is present upon inception of the heating in an amount of from 0.05 to 5 mol % based on the ε-caprolactam.

3. The process according to claim 2 wherein said main catalyst is a Grignard compound selected from the group consisting of ethylmagnesium bromide and phenylmagnesium iodide.

4. The process according to claim 3 wherein said Grignard compound is ethylmagnesium bromide.

5. The process according to claim 1 wherein said cocatalyst is present upon inception of the heating in an amount of from 0.005 to 1 mol % based on the ε-caprolactam.

6. The process according to claim 5 wherein said cocatalyst is acetylcaprolactam.

7. The process according to claim 5 wherein said cocatalyst is adipoyl-bis-caprolactam.

8. The process according to claim 5 wherein said cocatalyst is terephthaloyl-bis-caprolactam.

9. The process according to claim 5 wherein said cocatalyst is an isocyanic acid ester selected from the group consisting of phenyl isocyanate and hexamethylene diisocyanate.

10. The process according to claim 9 wherein said isocyanic acid ester is hexamethylene diisocyanate.

11. The process according to claim 1 wherein said activator is present upon inception of the heating in an amount of from 0.01 to 1 mol % based on the ε-caprolactam.

12. The process according to claim 11 wherein said activator is an amide selected from the group consisting of dimethylformamide, methylethylformamide, methylbutylformamide, diisopropylformamide, dimethylacetamide, methylphenylacetamide, dimethylpropionamide, diethylpropionamide, methylbenzylpropionamide and dimethylbenzoylamide.

13. The process according to claim 12 wherein said amide is dimethylacetamide.

14. The process according to claim 11 wherein said activator is a sulfoxide selected from the group consisting of dimethyl sulfoxide, methylethyl sulfoxide and methylphenyl sulfoxide.

15. The process according to claim 14 wherein said sulfoxide is dimethyl sulfoxide.

16. The process according to claim 11 wherein said activator is a thioether selected from the group consisting of methyl sulfide, ethyl sulfide, propyl sulfide, tetrahydrothiophene, dithiane and trithiane.

17. The process according to claim 16 wherein said thioether is trithiane.

18. The process according to claim 11 wherein said activator is a phosphoric ester selected from the group consisting of trimethyl phosphate, triethyl phosphate, methyldiethyl phosphate, tributyl phosphate, triphenyl phosphate and tricresyl phosphate.

19. The process according to claim 18 wherein said phosphoric ester is trimethyl phosphate.

20. The process according to claim 1 wherein said heating temperature is from 120° to 160° C.

21. The process according to claim 1 wherein said ultra-high molecular weight nylon 6 has a weight average molecular weight of from $5 \times 10^5$ to about $30 \times 10^5$.

* * * * *